United States Patent [19]

Matsuda et al.

[11] Patent Number: 5,347,270
[45] Date of Patent: Sep. 13, 1994

[54] METHOD OF TESTING SWITCHES AND SWITCHING CIRCUIT

[75] Inventors: Yoshio Matsuda; Harufusa Kondoh; Isamu Hayashi; Hiromi Notani, all of Itami, Japan

[73] Assignee: Mitsubishi Denki Kabushiki Kaisha, Tokyo, Japan

[21] Appl. No.: 889,379

[22] Filed: May 28, 1992

[30] Foreign Application Priority Data

Dec. 27, 1991 [JP] Japan .................. 3-346712

[51] Int. Cl.$^5$ .................. H04L 12/26; H04M 3/26
[52] U.S. Cl. .................. 340/825.8; 371/20.4; 379/10; 379/15
[58] Field of Search .................. 340/825.79, 825.8; 370/13, 15, 17; 371/20.1, 20.4; 379/9, 10, 11, 14, 15, 16, 17

[56] References Cited

U.S. PATENT DOCUMENTS

| 3,618,015 | 11/1971 | Homonick | 379/9 |
| 3,851,122 | 11/1974 | Gibson | 379/16 |
| 5,142,652 | 8/1992 | Schefts | 379/16 |

OTHER PUBLICATIONS

ISSCC '91 Digest of Technical Papers, pp. 242-243, and p. 321, Japan "A 400Mb/s 8×8 BiCMOS ATM Switch LSI with 128kb On-Chip Shared Memory", S. Tanaka, et al.

Primary Examiner—Wellington Chin
Attorney, Agent, or Firm—Oblon, Spivak, McClelland, Maier & Neustadt

[57] ABSTRACT

Incoming lines (I0 to I7) are connected to a space switch (2) through input data latches (1). The space switch (2) is connected to a normal/test changeover switch (12), which is connected to a normal/test changeover switch (13) through serial-to-parallel converting circuits (3), common buffer memories (4) and parallel-to-serial converting circuits (5). Space switches (6) are connected to the normal/test changeover switch (13). Outgoing lines (O0 to O7) are connected to the space switches 6 through output data latches (8). Connection states in the switches (2, 6) are placed in transposed relation to each other by a transposed connection generating circuit (10) in a test operation, so that the switches (2, 6) are directly connected to each other through the switches (12, 13). Predetermined data applied to the incoming lines are intactly used as expected values for judgement of the normal or abnormal operation of the set of switches of matrix structure.

21 Claims, 9 Drawing Sheets

METHOD OF TESTING SWITCHES AND SWITCHING CIRCUIT

BACKGROUND OF THE INVENTION

1. Field of the Invention

The present invention relates to a switching circuit and more particularly to a test technique for ATM switches.

2. Description of the Background Art

A data transmission system known as an ATM (Asynchronous Transfer Mode) is employed in a broadband ISDN (Integrated Service Digital Network). The ATM is one of the modes for allotting information in an exchange station when the information is transmitted from a plurality of transmitters, e.g., broadcasting stations to a plurality of receivers, e.g., homes.

In this mode, the information is divided into fixed-length blocks known as cells, which is transmitted or exchanged at high speeds, for example 150 Mbps. A standard cell is composed of signals of 53 bytes. A part of the cell, referred to as a header, includes the information specifying output destinations and the like. The number of bytes is sometimes increased by the additional increase of the information of one cell.

The center of cell exchange operations is ATM switches, which have been formed into circuits in increasing numbers recently. A plurality of cells are often concentrated on a single output destination in the exchange operations. This necessitates the provision of a buffer memory for queuing the cells in the ATM switch. The structures of the ATM switches are typically classified according to the location of the buffer memory in the switch into three types: input buffer type, output buffer type and common buffer type switching systems. The buffer memory is positioned before the switching in the input buffer type switching system. The buffer memory is positioned after the switching in the output buffer type switching system. The cells from respective inputs are multiplexed, and the multiplexed cells are stored in a common buffer memory shaped by respective outputs, in the common buffer type switching system.

Figure 9:
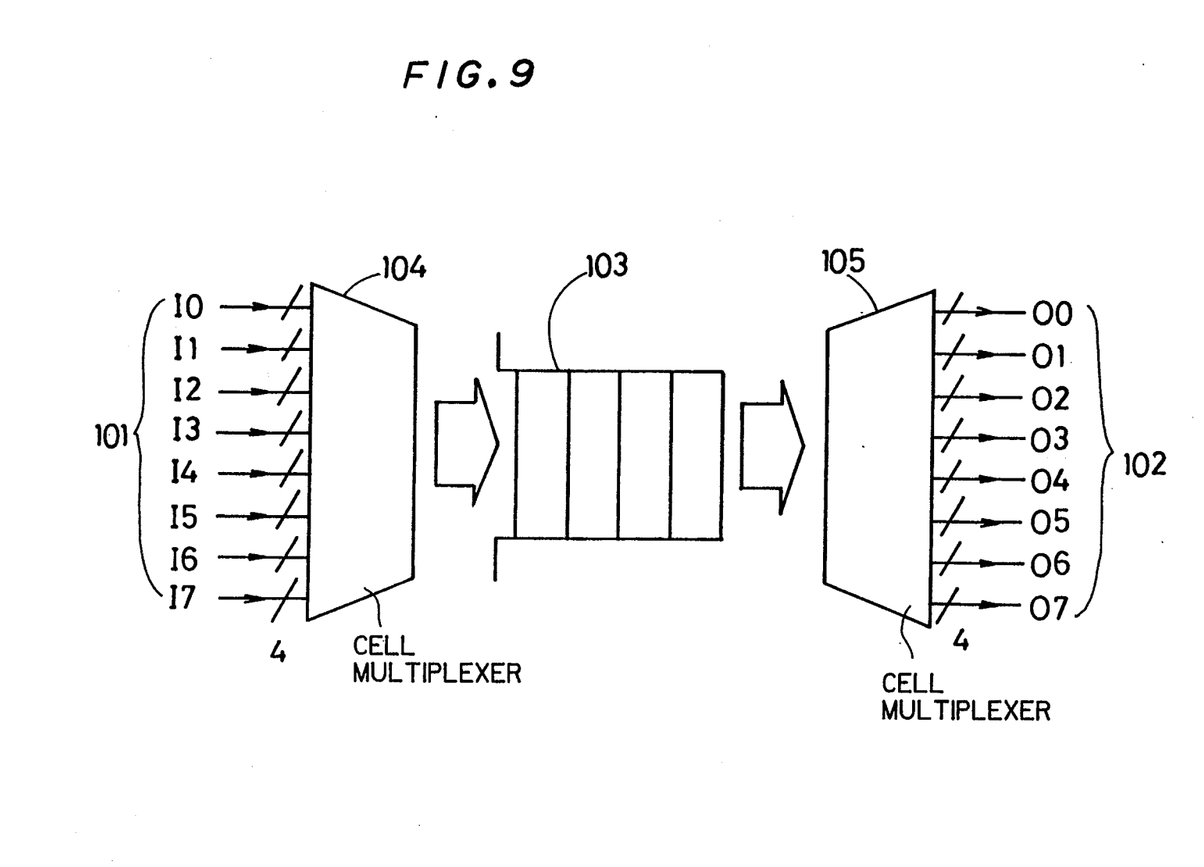
FIGS. 9 and 10 conceptionally show conventional circuits of common buffer type switching system, respectively.

There is conceptionally shown in FIG. 9 a structure of the ATM switch of the common buffer type switching system which is taught in 1991 International Solid-State Circuits Conference, Digest of Technical Papers, pp. 242-243. All incoming and outgoing lines 101 and 102 share a single FIFO buffer memory 103. The cells inputted from the incoming lines 101 are written to the FIFO buffer memory 103 through a cell multiplexer 104, and the cells read out of the FIFO buffer memory 103 are outputted to the outgoing lines 102 through a cell demultiplexer 105. The cells to be outputted to the same outgoing line, if inputted from two or more incoming lines, are temporarily held in the FIFO buffer memory 103. When the FIFO buffer memory 103 is full, the cells are discarded.

Such a circuit of the common buffer type switching system must be provided with a large-capacity, high-speed FIFO buffer memory. Since the bit rate is 155.52 Mbps in the broadband ISDN, an 8×8 configuration ATM switch needs a throughput of about 1.2 Gbps (150 Mbps×8). To minimize a cell discard rate, the FIFO buffer memory must have a capacity for storing a few hundred cells.

Figure 10:
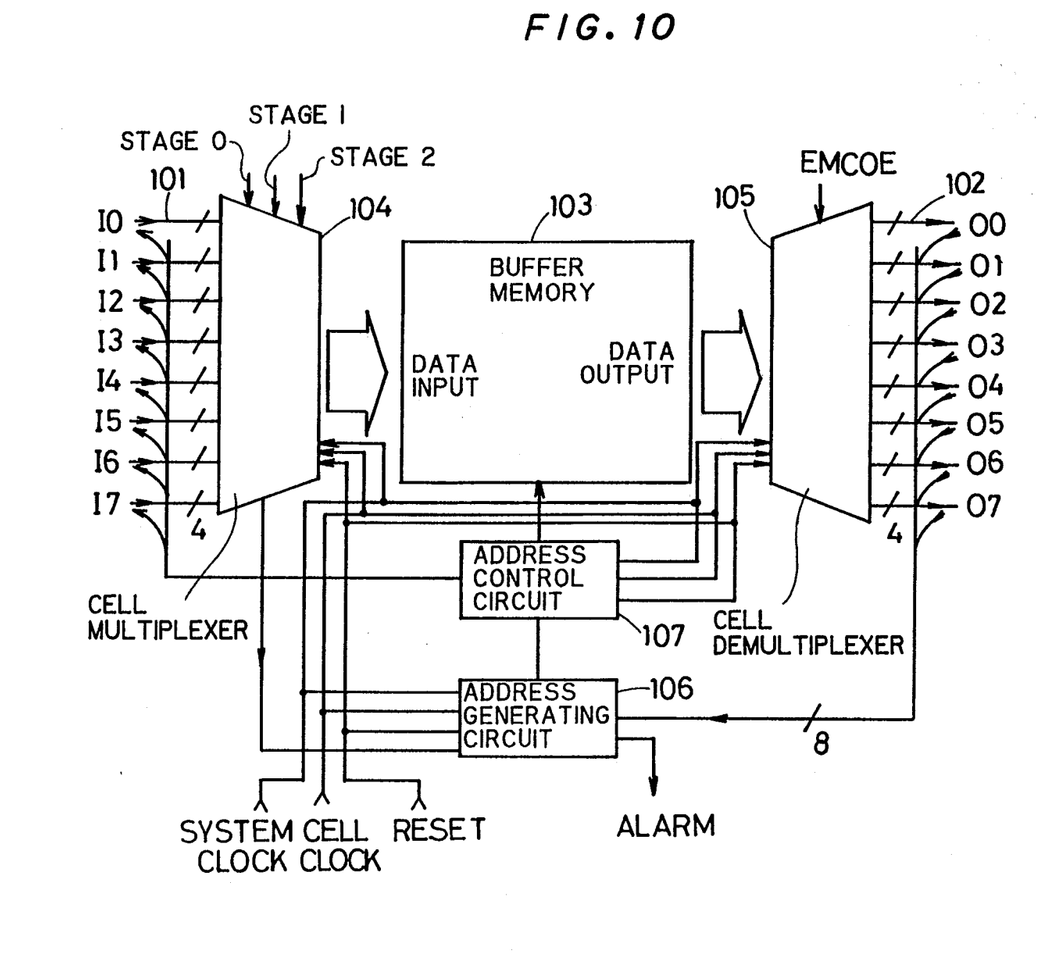

FIG. 10 shows in more detail the structure of the ATM switch of FIG. 9. Data are inputted to each incoming line in 4-bit parallel. The cell multiplexer 104 for performing a serial-to-parallel conversion converts the inputted data into 128-bit (4×32) parallel data, which are written to the common buffer memory 103. An address generating circuit 106 detects, from the header of the cell, the outgoing line to which the cell is to be outputted and correspondingly specifies the address of the FIFO buffer memory 103. The cell demultiplexer 105 having a capability of a 32:1 parallel-to-serial conversion reconverts the 128-bit parallel data into 4-bit parallel data, which are outputted to the outgoing line. An address control circuit 107 controls the read/write addresses of the FIFO memory in accordance with the address specified by the address generating circuit 106.

The common buffer type switching system is effective in terms of reduction in the total capacity of the buffer memory. However, very high memory access speeds are required for the common buffer type switching system in which the multiplexed input data are written to the large common buffer memory at high speeds and the data are read out of the large common buffer memory at high speeds to be outputted to the outgoing lines.

To eliminate the foregoing drawbacks, a switching system of dividing the buffer memory has been considered. This system enables the access speed of the buffer memory to decrease while maintaining the advantages of the common buffer type switching system.

For achievement of the system, however, a pair of switches of matrix structure must be used. The system has a problem in that a long test pattern is necessary to test a switching circuit including the switches.

SUMMARY OF THE INVENTION

The present invention is intended for a method of testing switches of a signal transmission system including a signal processor for performing a predetermined processing upon receipt of a plurality of inputs in predetermined number to provide outputs in the same number as the predetermined number, a first switch of matrix structure for performing a first predetermined exchange before the predetermined processing, and a second switch of matrix structure for performing a second predetermined exchange after the predetermined processing. According to the present invention, the method comprises the steps of: (a) placing a matrix indicative of connection in the first switch in transposed relation to a matrix indicative of connection in the second switch; (b) connecting the first switch to the second switch, with the signal processor bypassed; (c) inputting a predetermined data to the first switch; and (d) judging if a data from the second switch coincides with the predetermined data.

In this method, the matrix indicative of the connection in the first switch of matrix structure is placed in transposed relation to the matrix indicative of the connection in the second switch of matrix structure to carry out the test. The normal or abnormal operation of the switches are judged by whether or not the predetermined data inputted to the first switch coincides with the data outputted from the second switch.

The present invention is also intended for a switching circuit. According to the present invention, the switching circuit comprises: a plurality of incoming lines in predetermined number; a first switch of matrix structure having input ends in the predetermined number connected to the incoming lines and output ends in the predetermined number, the first switch performing a first predetermined exchange on data inputted to the input ends to produce and output processed data to the output ends; a first changeover switch having common, first and second ends, the common end being connected to the first switch; a signal processor having input and output ends, the input end being connected to the first end of the first changeover switch; a second changeover switch having common, first and second ends, the first end being connected to the output end of the signal processor, the second end being connected to the second end of the first changeover switch; a second switch of matrix structure having input ends in the predetermined number connected to the common end of the second changeover switch and output ends in the predetermined number, the second switch performing a second predetermined exchange on outputs of the signal processor in a normal operation and performing a third predetermined exchange on the processed data in a test operation, to produce and output data to the output ends; outgoing lines in the predetermined number connected to the output ends of the second switch; and a switching control circuit for controlling the first and second changeover switches such that the common ends of the first and second changeover switches are connected to the first ends thereof in the normal operation and such that the common ends of the first and second changeover switches are connected to the second ends thereof in the test operation.

In the switching circuit of the present invention, the first switch on the input side is directly connected to the second switch on the output side, bypassing the signal processor, in the test operation. The switches are tested independently of the signal processor.

Preferably, the switching circuit further comprises a transposed connection generating circuit connected to the second switch for controlling a connection state in the second switch, wherein a matrix indicative of the third predetermined exchange is in transposed relation to a matrix indicative of the first predetermined exchange.

In particular, the provision of the transposed connection generating circuit for achieving the transposed relation enables the matrix indicative of the connection state in the second switch to be automatically placed in transposed relation to the matrix indicative of the connection state in the first switch.

Preferably, the switching circuit further comprises a judging circuit having a first input end connected to the incoming lines, a second input end connected to the outgoing lines, and an output end, the judging circuit judging the data outputted from the second switch by using the data inputted to the input ends of the first switch as expected values to output a judgement result to the output end in the test operation.

Since the test is carried out with the matrix indicative of the connection state in the second switch placed in transposed relation to the matrix indicative of the connection state in the first switch, the predetermined data applied to the incoming lines are intactly used as the expected values without regard to the connection state in the first switch, to judge whether the switches are in normal or abnormal operation.

As above described, the first switch, bypassing the signal processor, is directly connected to the second switch in the test operation. The test of the first and second switches is carried out independently. Since the connection state in the first switch is in transposed relation to the connection state in the second switch, the test of the first and second switches is carried out by using the input data applied to the incoming lines intactly as the expected values. There is no need to store the expected values for judgement of the test results in an external device such as a tester. A long test pattern is executed very easily.

The "transposed relation" is the relation in which elements in the i-th row, the j-th column of a square matrix are equal to elements in the j-th row, the i-th column of another square matrix.

It is an object of the present invention to provide a method of testing a pair of switches without difficulty and a switching circuit to which the method is easily applied.

These and other objects, features, aspects and advantages of the present invention will become more apparent from the following detailed description of the present invention when taken in conjunction with the accompanying drawings.

DESCRIPTION OF THE PREFERRED EMBODIMENTS

Description will be given hereinafter on an ATM switch of common buffer type switching system which is developed in a 8×8 matrix according to a preferred embodiment of the present invention. Although the standard number of bits for a cell is 53 bits (53 bytes/8) because eight ATM switches are connected in parallel for practical use, a cell of 55 bits, by addition of 2 bits, is described hereinafter.

Figure 1:
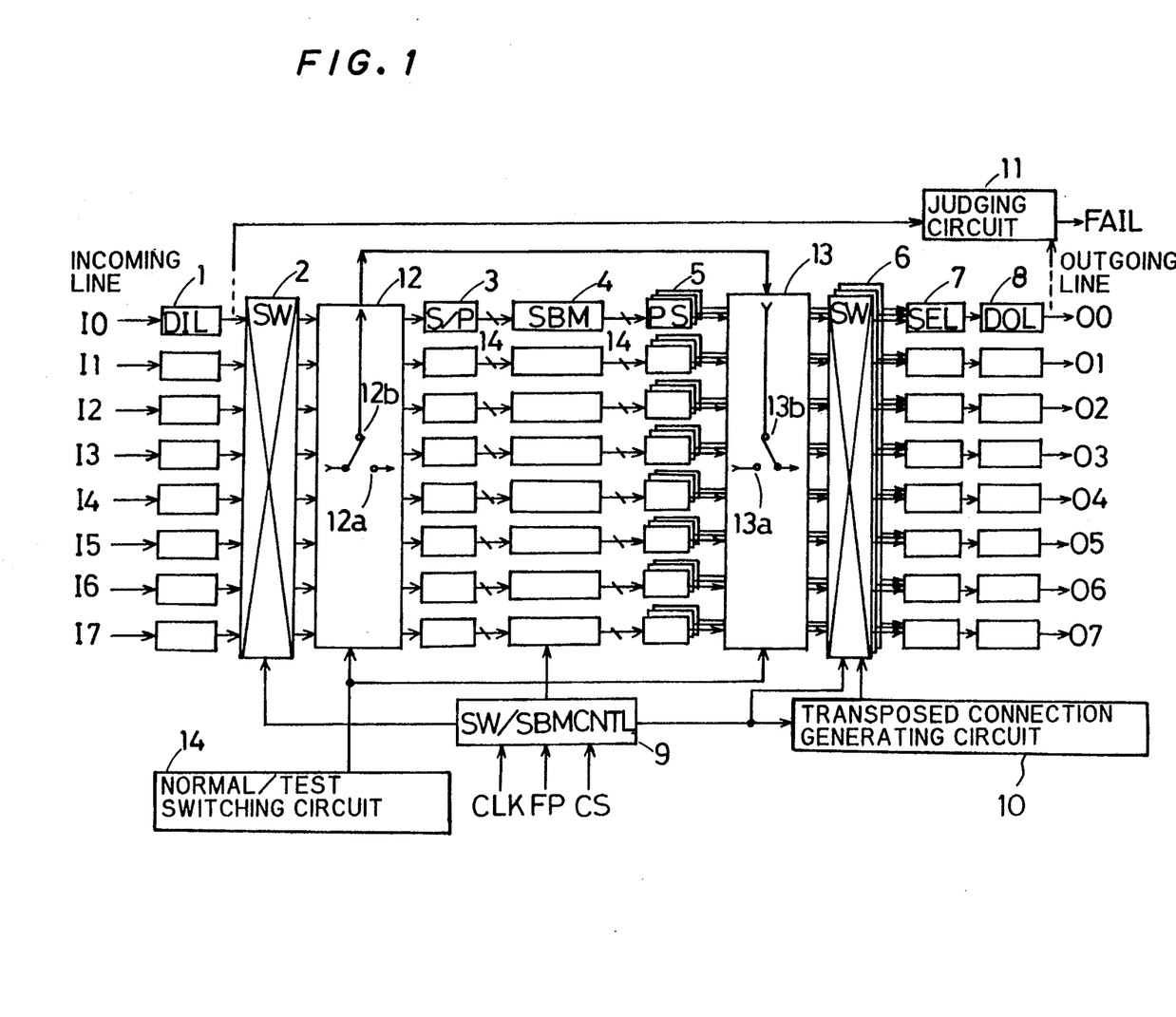
FIG. 1 is a block diagram of an ATM switch according to a preferred embodiment of the present invention.

FIG. 1 is a block diagram of the ATM switch. Eight incoming lines I0 to I7 are connected to a input-side space switch (SW) 2 through input data latches (DIL) 1.

When a normal/test changeover switch 12 is switched to a normal side 12a, the space switch 2 is connected to common buffer memories (SBM) 4 through serial-to-parallel converting circuits (S/P) 3. The common buffer memories 4, each having a capacity of several Kb, are normal single port RAMs.

When a normal/test changeover switch 13 is switched to a normal side 13a, three output-side space switches (SW) 6 are connected to the common buffer memories 4 through three parallel-to-serial converting circuits (P/S) 5, respectively. Outgoing lines O0 to O7 are connected to the space switches 6 through selectors (SEL) 7 and output data latches (DOL) 8.

The space switches 2 and 6 are achieved by cross point switches of matrix configuration. In this preferred embodiment, the cross point switches formed into an 8×8 square matrix are employed.

A transposed connection generating circuit 10 is connected to the space switches 6. A clock CLK, frame pulses FP and a control signal CS are inputted to a SW/SBM control circuit 9, which is connected to the space switches 2 and 6, common buffer memories 4 and transposed connection generating circuit 10. A judging circuit 11 is connected to the output ends of the data latches 1 and 8.

The normal operation of the ATM switch thus constructed is described below. Data inputted from the incoming lines I0 to I7 are latched by the data latches 1 and are then written to the common buffer memories 4 through the space switch 2. The connection in the space switch 2 is set such that the data are preferentially written to the least crowded common buffer memory 4. Such setting is performed by the SW/SBM control circuit 9 upon receipt of the control signal from a control chip not shown. An instruction as to the connections is given before a period (one slot) in which one cell is processed. The connections are changed over all at once at the cell end.

The serial-to-parallel converting circuits 3, provided for improving the processing speed of the cells without increasing the operating speed of the common buffer memories 4, converts the serial data outputted from the space switch 2 into parallel data of 14, 14, 14 and 13 bits for each cell (55 bits). The parallel data are written to the specified addresses of the common buffer memories 4. The write addresses of the common buffer memories 4 are controlled by the SW/SBM control circuit 9.

To avoid blocking which occurs when a plurality of cells are read out of the same common buffer memory 4, three read operations from the common buffer memory 4 are carried out during fourteen (or thirteen) clocks for one write operation to the common buffer memory 4. That is, each common buffer memory 4 is accessed sixteen times $(4 \times (1+3) = 16)$ during one slot.

The three output-side parallel-to-serial converting circuits 5 are provided for the three read operations. The parallel-to-serial converting circuits 5 read, at specified timings, the cells stored in the predetermined addresses of the common buffer memories 4 to convert the cells from a parallel form to a serial form in the unit of 14 bits. The predetermined addresses are specified by the control chip not shown and are controlled by the SW/SBM control circuit 9. The first and second read cells must wait during predetermined clocks in latch circuits not shown, respectively, for timing adjustment to the third read cell.

The three space switches 6 are provided in corresponding relation to the three cells. The selectors 7 select the cell to be outputted through the output latches 8 to the outgoing lines O0 to O7 among the outputs of the three space switches 6.

An instruction from the control chip not shown determines the outgoing line to which the selected output of the space switch 6 is outputted. The SW/SBM control circuit 9 upon receipt of the control signal sets the connections of the cross point switches. The method of exchanging signals in the normal operation according to the present invention is disclosed in, for example, Japanese Patent Application No. 1-275645 by the applicant of the present invention.

Figure 4:
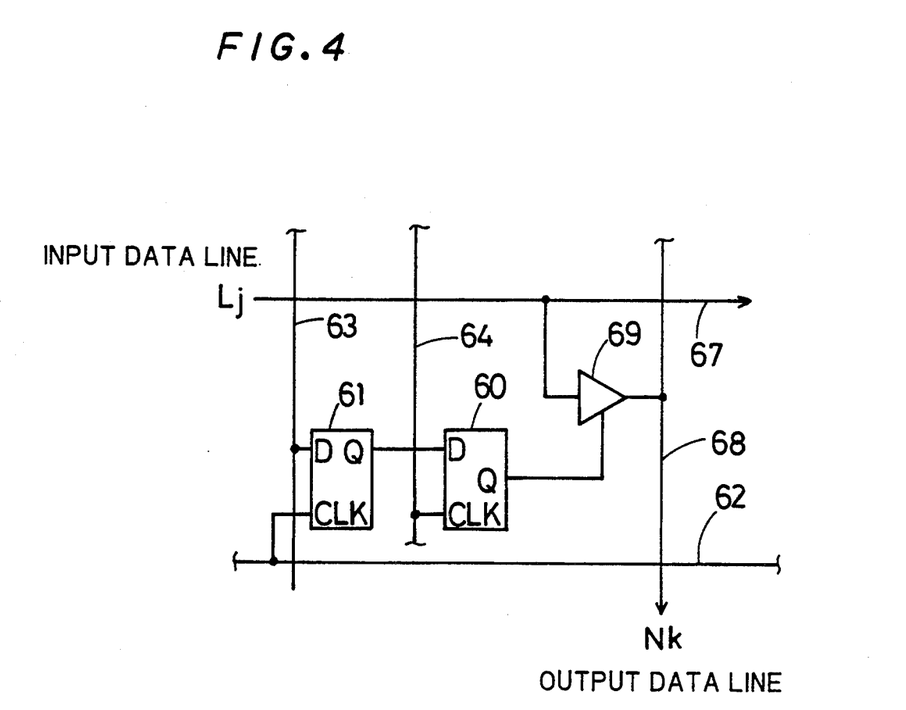
FIG. 4 is a diagram of a cross point switch.

FIG. 4 shows a unit of the cross point switches. A connection data set line 63 determines an output data line to be connected to an input data line (Lj) 67. The connection data set line 63 gives an input to a master latch 61, and an update line 64 gives a clock to a slave latch 60. Connection states during current and next slots are applied to the slave and master latches 60 and 61, respectively. A row selecting decoder line 62 applies a clock to the master latch 61. When the row selecting decoder line 62 determines the connection of the input data line Lj to an output data line ($N_K$) 68, the information of the connection data set line 63 loaded on the master latch 61 by the signal on the update line 64 is applied to a tri-state buffer 69 through the slave latch 60 (because of the selection of the input data line Lj) to activate the tri-state buffer 69.

The normal/test changeover switches 12, 13 and a normal/test switching circuit 14 for controlling them facilitate the test of the space switches 2 and 6, in the present invention. Operations in a test mode (test operation) will be discussed below.

In the test mode, the input-side and output-side space switches 2 and 6, bypassing the common buffer memories 4, are directly connected to each other. At the same time, the transposed connection information generating circuit 10 is placed into operation and generates connection data for placing the connection in the output-side space switches 6 in transposed relation to the connection in the input-side space switch 2.

Figure 2:
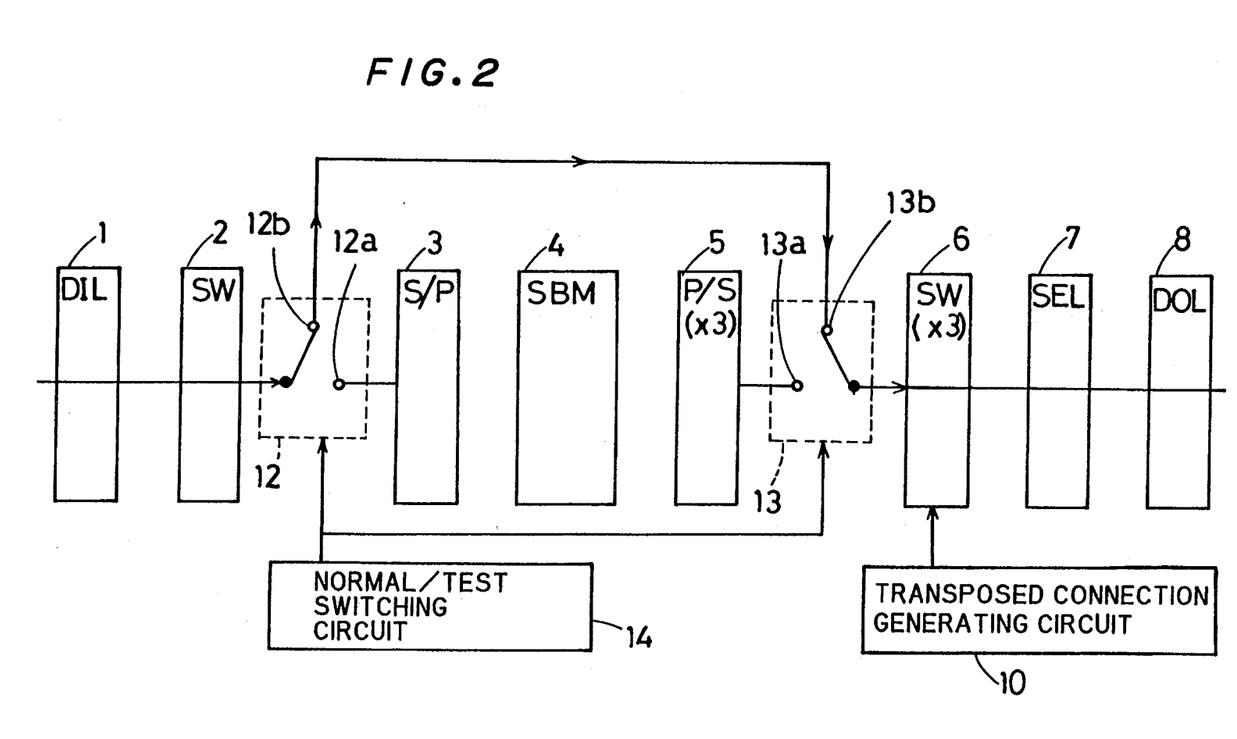
FIG. 2 shows a data flow in the ATM switch in a test mode according to the preferred embodiment.

FIG. 2 schematically shows a data flow in the test mode. The normal/test switching circuit 14 switches the normal/test changeover switches 12 and 13 to the test sides 12b and 13b, respectively. The data inputted to the input-side space switch 2 bypasses the serial-to-parallel converting circuit 3, common buffer memory 4 and parallel-to-serial converting circuit 5 and is inputted to the output-side space switch 6. The data is then outputted through the selector 7. At this time, the common buffer memory 4, serial-to-parallel converting circuit 3 and parallel-to-serial converting circuit 5 are independently tested as another block. The foregoing structure affords the separation of data flows and facilitates the tests of the respective blocks.

Matrices indicative of the connection states in the input-side and output-side space switches 2 and 6 are set in transposed relation to each other. This is referred to as "the connection states being in transposed relation" hereinafter. When the space switches 2 and 6 are normal, the data inputted from the incoming line Ij is outputted to the outgoing line Oj (j=0 to 7) without regard to the connection state in the input-side space switch 2. It is more effective for efficient tests.

Figure 3:
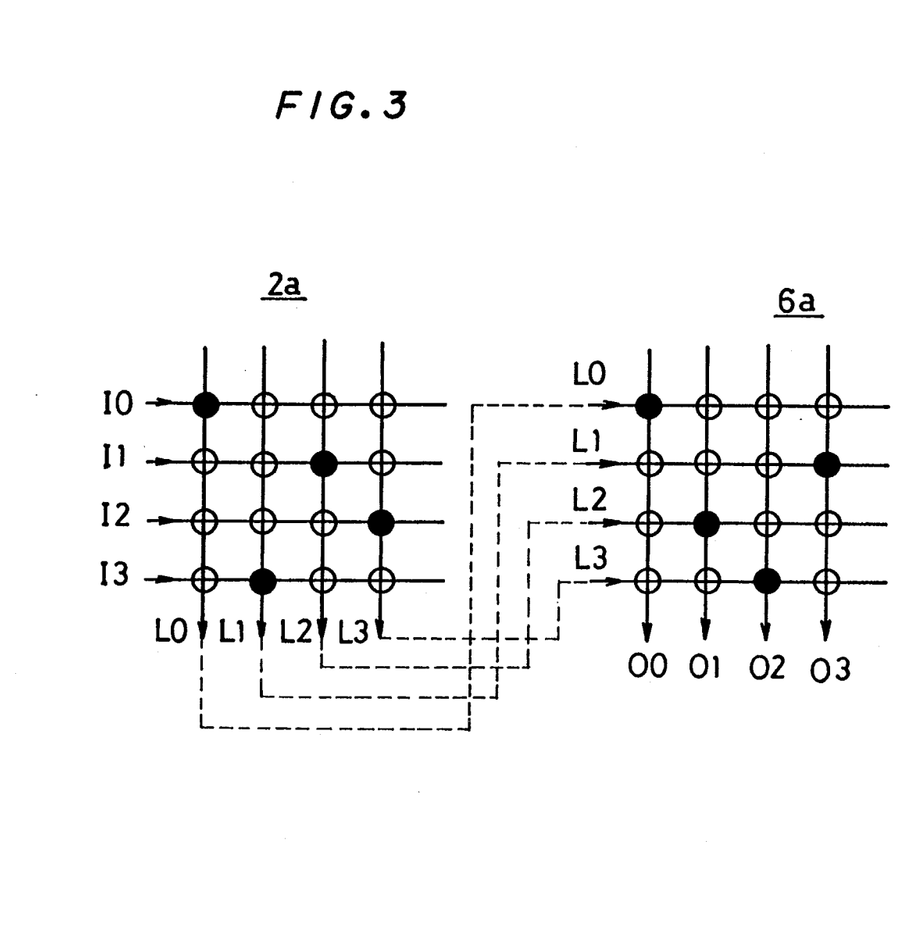
FIG. 3 illustrates a method of testing switches according to the preferred embodiment.

FIG. 3 shows data flows where the connection states are in transposed relation and the operations of the transposed connection generating circuit. For simplicity, description will be given on an example in which input-side and output-side space switches 2a and 6a are of 4×4 matrix structure. The intersections of FIG. 3 indicated by closed and open circles indicate that the intersections are connected and disconnected, respectively. For simplicity, the space switches 2a and 6a have one-to-one correspondence in FIG. 3, although they have one-to-three correspondence in FIG. 1.

The connection state in the space switch 2a is set such that the incoming lines I0, I1, I2, I3 are connected to signal lines L0, L2, L3, L1, respectively. The connection state in the space switch 6a is correspondingly set such that the signal lines L0, L1, L2, L3 are connected to the outgoing lines O0, O3, O1, O2, respectively. Matrices A and B indicative of the respective connection states in the space switches 2a and 6a are expressed as:

$$A = \begin{bmatrix} 1 & 0 & 0 & 0 \\ 0 & 0 & 1 & 0 \\ 0 & 0 & 0 & 1 \\ 0 & 1 & 0 & 0 \end{bmatrix} \quad (1)$$

$$B = \begin{bmatrix} 1 & 0 & 0 & 0 \\ 0 & 0 & 0 & 1 \\ 0 & 1 & 0 & 0 \\ 0 & 0 & 1 & 0 \end{bmatrix}$$

where "1" indicates connection and "0" indicates disconnection. In the matrices A and B, the rows correspond to the lines inputted to the space switches and the columns correspond to the lines outputted from the space switches. The matrices A and B are in transposed relation to each other.

When the space switches 2a and 6a are connected to each other in such connection states, the data inputted from the input-side space switch 2a pass through I0→L0→O0, I1→L2→O1, I2→L3→O2, I3→L1→O3, respectively. The data of the incoming line Ij is outputted to the outgoing line Oj (j=0 to 3). The input data are intactly used as expected values for judgement, and there is no need to hold the expected values for judgement of the test results in an external device such as a tester. This enables very simple execution of long test patterns.

Figure 5:
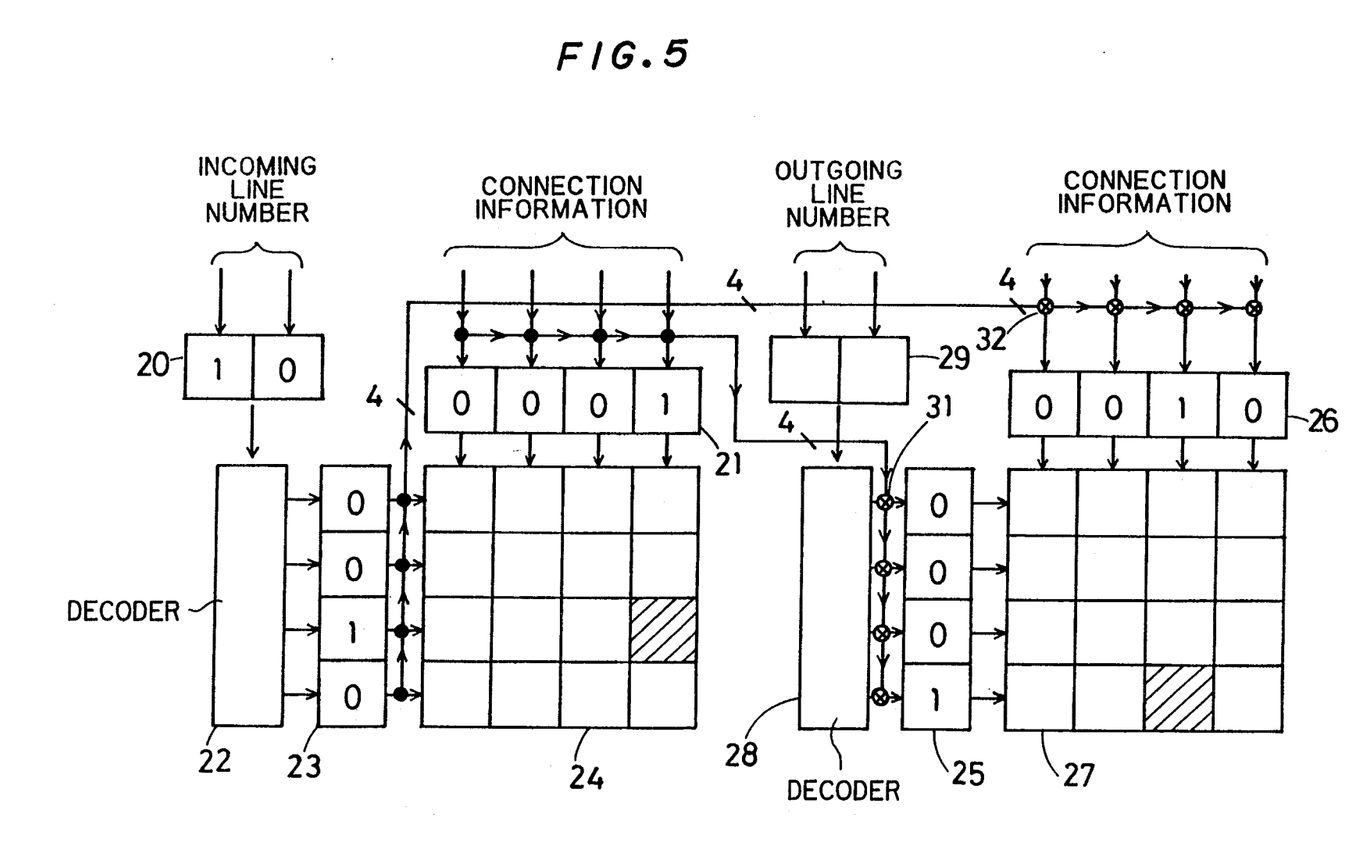
FIG. 5 illustrates a method of placing a connection state in an output-side space switch in transposed relation to a connection state in an input-side space switch.

FIG. 5 illustrates a detailed process for placing the connection state in the space switch 6a in transposed relation to the connection state in the space switch 2a by means of the transposed connection generating circuit 10. Herein discussed is a case in which the incoming line I2 is connected to the signal line L3 in the input-side space switch 2a. An incoming line number (a 2-bit signal "10") and a connection information (a 4-bit signal "001") indicative of the connection of the input data line specified by the incoming line number are transmitted to an input data register 20 and a connection data register 21, respectively. The signal "0001" of the connection information indicates the signal lines L0 to L3 in order from the MSB to the LSB. The switches corresponding to the bits "1" and "0" are connected and disconnected, respectively. A decoder 22 decodes the incoming line number "10"0 into a 4-bit incoming line signal "0010" (indicative of the incoming lines I0 to I3 in order from the MSB to the LSB). The incoming line signal is latched by a space switch selecting circuit 23, in which a switch row corresponding to the incoming line I2 is selected. The connection information is written to the space switch corresponding to the switch row. The hatched portions of FIG. 5 are regions to be connected. The connection is performed in detail such that the connection information of the next slot is loaded on the master latch 63 of FIG. 4 in the switches constituting the space switch 2a. The connection information is loaded, row by row, on the master latch 61 in the row specified by the incoming line signal during the passage of one cell. A signal is transmitted to the update line 64 at the cell end, so that the connection state is updated.

Figure 6:
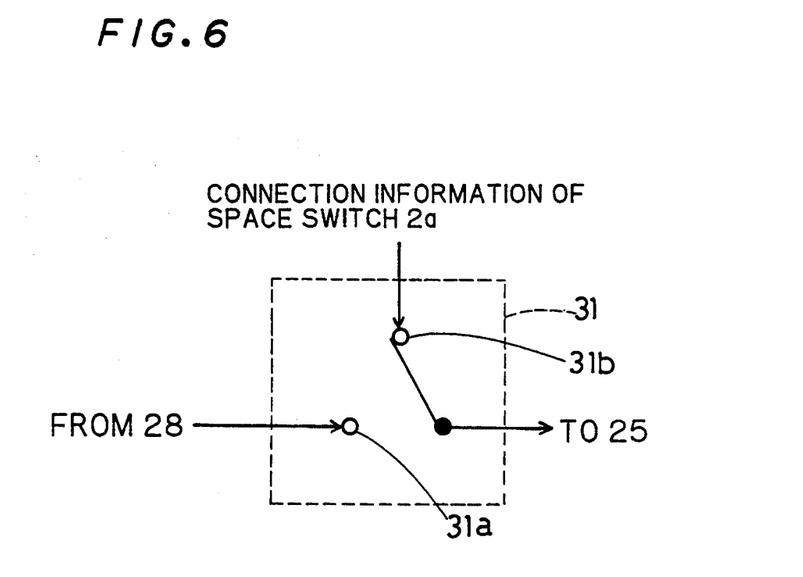
FIGS. 6 and 7 are diagrams of changeover switches, respectively.
Figure 7:
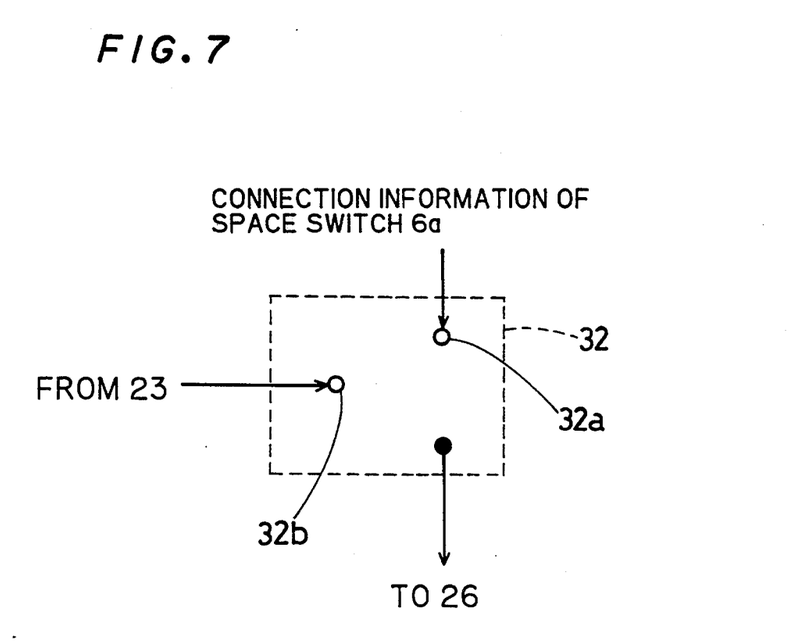

The output-side space switch 6a also includes an input data register 29, a decoder 28 for decoding an outgoing line number applied to the register 29, a connection data register 26 and a space switch selecting circuit 25, similarly to the input-side space switch 2a. There are provided changeover switches 31 between the decoder 28 and the space switch selecting circuit 25. The connection information from the control chip not shown as well as the information of the space switch selecting circuit 23 are applied to switches 32. The changeover switches 31 and 32 perform the switching to normal sides 31a, 32a and to test mode sides 31b, 32b as shown in FIGS. 6 and 7.

In the test operation, the connection information applied to the connection data register 21 of the input-side space switch 2a is applied to the space switch selecting circuit 25 of the output-side space switch 6a. Specifically, the changeover switches 31 are switched to the test mode side 31b. Thus the information of the columns of the matrix corresponding to the space switch 2a is applied to the space switch selecting circuit 25 as the information of the rows of the matrix corresponding to the space switch 6a.

The incoming line signal applied to the space switch selecting circuit 23 is applied to the connection data register 26 of the space switch 6a. Specifically, the changeover switches 32 are switched to the test mode side 32b. Thus the information of the rows of the matrix corresponding to the space switch 2a is applied to the connection data register 26 as the information of the columns of the matrix corresponding to the space switch 6a.

The connection state in the space switch 6a is automatically maintained in transposed relation to the connection state in the space switch 2a in the foregoing manner. In the normal operation, the changeover switches 31 and 32 are switched to the normal sides 31a and 32a. The incoming line number is applied to the decoder 28 through the output data register 29, and the connection information is applied to the connection data register 26. This provides for the operations similar to the space switch 2a as described with reference to FIG. 4 and, accordingly, the normal exchange operations.

Although the connection state in the space switch 6 is automatically placed in transposed relation to the connection state in the space switch 2 in the test mode operation by the provision of the transposed connection generating circuit 10 in the preferred embodiment, the transposed connection generating circuit 10 is not necessarily provided. When the transposed connection generating circuit 10 is not provided, a tester for applying the test patterns to the incoming lines may previously hold programs for obtaining a connection state in transposed relation to the connection state in the space switch 2, to determine the connection state in the space switch 6 in accordance with the programs. The connection of the space switch 6 may be performed simultaneously with or after the connection of the space switch 2.

In the preferred embodiment, the transposed connection generating circuit 10 is connected to the space switches 6 to control the connection state in the space switches 6. However, the transposed connection generating circuit 10 may be connected to the space switch 2 to control the connection state in the space switch 2, whereby the connection states in the space switches 2 and 6 are placed in transposed relation to each other.

Figure 8:
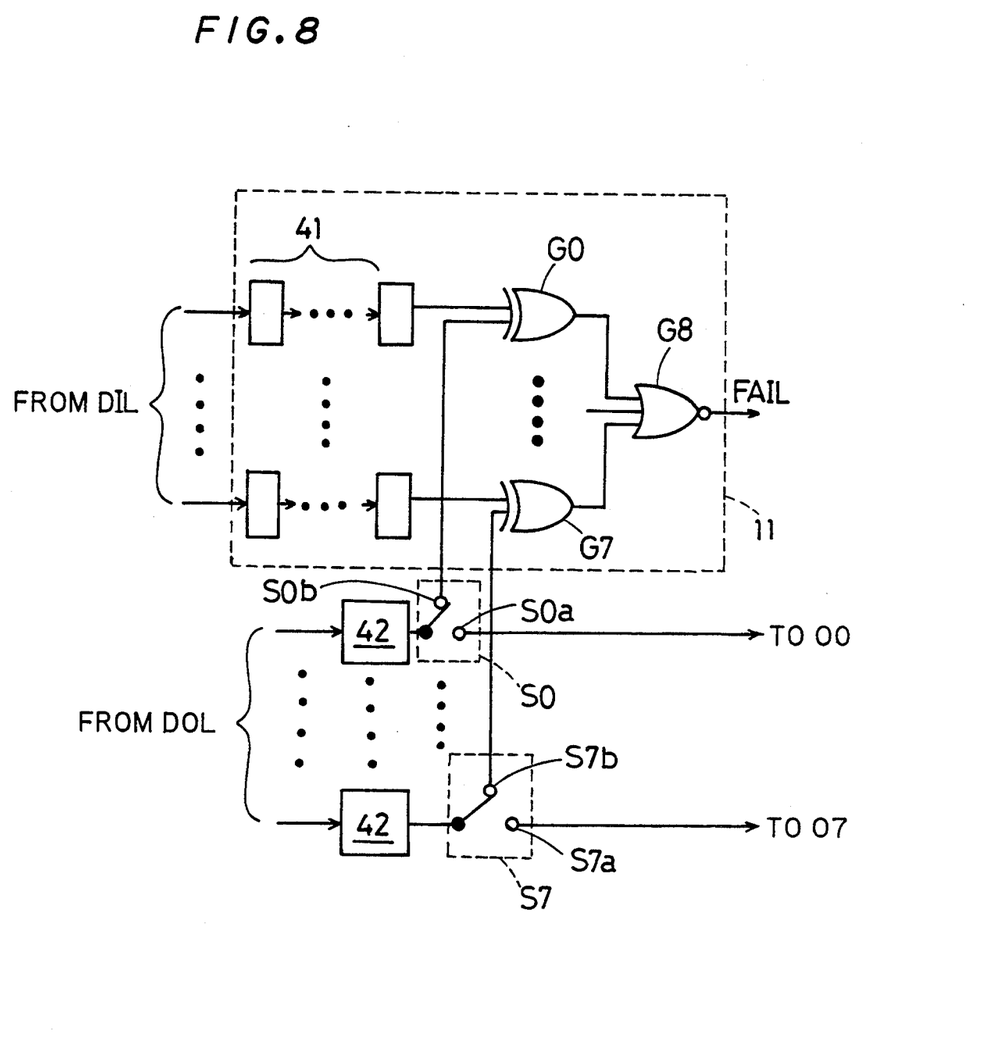
FIG. 8 is a diagram of a judging circuit.

FIG. 8 is a diagram of the judgement circuit 11. Signals applied to the input data latches 1 are inputted to shift register groups 41. The shift register groups 41 are connected, group by group, to the respective input data latches 1. Each of the shift register groups 41 includes a plurality of shift registers connected in series in consideration for delay phase differences between the outputs from the output data latches 8. The signals applied to the input data latches 1 are transmitted to respective one input of gates G0 to G7 to be used as the expected values in the test mode operation.

Signals from the output data latches 8 are, on the other hand, applied to latches 42 and are then transmitted to changeover switches S0 to S7. The changeover switches S0 to S7 are switched to normal sides S0a to S7a in the normal operation, and the signals from the output data latches 8 are transmitted to the outgoing lines O0 to O7. In the test mode operation, the switches S0 to S7 are switched to test mode sides S0b to S7b, and the signals from the output data latches 8 are transmitted to respective other input of the gates G0 to G7.

The gates G0 to G7 calculates exclusive ORs, which are inputted to an NOR gate G8. When the signals applied to the input data latches 1 do not coincide with the signals from the output data latches 8, a signal FAIL is outputted and the test result is judged as abnormal.

While the invention has been shown and described in detail, the foregoing description is in all aspects illustrative and not restrictive. It is therefore understood that numerous modifications and variations can be devised without departing from the scope of the invention.

What is claimed is:

1. A method of testing switches of a signal transmission system including a signal processor for performing a predetermined processing upon receipt of a plurality of inputs in predetermined number to provide outputs in the same number as said predetermined number, a first switch of matrix structure for performing a first predetermined exchange before said predetermined processing, and a second switch of matrix structure for performing a second predetermined exchange after said predetermined processing, said method comprising the steps of:
   (a) placing a matrix indicative of connection in said first switch in transposed relation to a matrix indicative of connection in said second switch;
   (b) connecting said first switch to said second switch, with said signal processor bypassed;
   (c) inputting a predetermined data to said first switch; and
   (d) judging if a data from said second switch coincides with said predetermined data.

2. The method of claim 1,
wherein said signal processor includes storage means, and
wherein said predetermined processing includes the steps of:
writing said plurality of inputs exchanged by said first switch to said storage means as storage data; and
reading said storage data from said storage means.

3. The method of claim 2,
wherein said signal processor further includes converting means for serial-to-parallel and parallel-to-serial data conversions, and
wherein said predetermined processing further includes the steps of:
serial-to-parallel converting said plurality of inputs; and
parallel-to-serial converting said storage data.

4. The method of claim 1, wherein said step (a) includes the steps of:

(a-1) making the connection in said first switch; and
(a-2) making, in said second switch, connection indicated by a transposed matrix of the matrix indicative of the connection in said first switch.

5. The method of claim 4,
wherein said step (a-1) includes the steps of:
(a-1-1) applying to said first switch a row information specifying one row to be connected in said first switch; and
(a-1-2) applying to said first switch a column information specifying one column to be connected in said one row to be connected in said first switch, and
wherein said step (a-2) includes the steps of:
(a-2-1) specifying one row to be connected in said second switch by said column information; and
(a-2-2) specifying one column to be connected in said one row to be connected in said second switch by said row information.

6. The method of claim 1, wherein said step (a) includes the steps of:
(a-3) making the connection in said second switch; and
(a-4) making, in said first switch, connection indicated by a transposed matrix of the matrix indicative of the connection in said second switch.

7. The method of claim 1, wherein said step (d) includes the step of
(d-1) determining an exclusive OR of said data from said second switch and said predetermined data.

8. A switching circuit comprising:
a plurality of incoming lines in predetermined number;
a first switch of matrix structure having input ends in said predetermined number connected to said incoming lines and output ends in said predetermined number, said first switch performing a first predetermined exchange on data inputted to said input ends thereof to produce and output processed data to said output ends thereof;
a first changeover switch having common, first and second ends, said common end being connected to said first switch;
a signal processor having input and output ends, said input end thereof being connected to said first end of said first changeover switch;
a second changeover switch having common, first and second ends, said first end thereof being connected to said output end of said signal processor, said second end thereof being connected to said second end of said first changeover switch;
a second switch of matrix structure having input ends in said predetermined number connected to said common end of said second changeover switch and output ends in said predetermined number, said second switch performing a second predetermined exchange on outputs outputted to said output end of said signal processor in a normal operation and performing a third predetermined exchange on said processed data in a test operation, to produce and output data to said output ends thereof;
outgoing lines in said predetermined number connected to said output ends of said second switch; and
a switching control circuit for controlling said first and second changeover switches such that said common ends of said first and second changeover switches are connected to said first ends thereof in the normal operation and such that said common ends of said first and second changeover switches are connected to said second ends thereof in the test operation.

9. The switching circuit of claim 8, further comprising an input latch connected between said incoming lines and said first switch.

10. The switching circuit of claim 9, further comprising an output latch connected between said second switch and said outgoing lines.

11. The switching circuit of claim 8, wherein said signal processor includes storage means for storing said processed data.

12. The switching circuit of claim 11,
wherein said signal processor further includes:
a multiplexer for serial-to-parallel converting said processed data; and
a demultiplexer for parallel-to-serial converting said outputs of said signal processor.

13. The switching circuit of claim 8, further comprising a transposed connection generating circuit connected to said second switch for controlling a connection state in said second switch,
wherein a matrix indicative of said third predetermined exchange is in transposed relation to a matrix indicative of said first predetermined exchange.

14. The switching circuit of claim 13,
wherein said first predetermined exchange is specified by a first row information specifying one row to be connected in said first switch in the normal operation and a first column information specifying one column to be connected in said one row to be connected in said first switch in the normal operation,
wherein said second predetermined exchange is specified by second row information specifying one row to be connected in said second switch in the normal operation and a second column information specifying one column to be connected in said one row to be connected in said second switch in the normal operation, and
wherein said transposed connection generating circuit includes:
a third changeover switch having first, second and common ends, said second row information being inputted to said first end thereof, said first column information being inputted to said second end thereof, said common end thereof outputting a third row information specifying one row to be connected in said second switch; and
a fourth changeover switch having first, second and common ends, said second column information being inputted to said first end thereof, said first row information being inputted to said second end thereof, said common end thereof outputting a third column information specifying one column to be connected in said row specified by said third row information in said second switch,
each of said common ends of said third and fourth changeover switches being connected to said first ends thereof, respectively, said second row and column informations being given as said third row and column informations, respectively, in the normal operation; and
each of said common ends of said third and fourth changeover switches being connected to said second ends thereof, respectively, said first column and row informations being given as said third row and column informations, respectively, in the test operation.

15. The switching circuit of claim 14,
wherein said transposed connection generating circuit further includes:
a first latch for receiving and temporarily holding said first row information to thereafter transmit said first row information to said second end of said fourth changeover switch; and
a second latch for receiving and temporarily holding said first column information to thereafter transmit said first column information to said second end of said third changeover switch.

16. The switching circuit of claim 13, further comprising a judging circuit having a first input end connected to said incoming lines, a second input end connected to said outgoing lines, and an output end, said judging circuit judging said data outputted from said second switch by using said data inputted to said input ends of said first switch as expected values to output a judgement result to said output end thereof in the test operation.

17. The switching circuit of claim 16, further comprising:
an output latch connected between said second switch and said outgoing lines; and
a fifth changeover switch having a common end connected to said output latch, a first end connected to said outgoing lines, and a second end connected to said second input end of said judging circuit,
said fifth changeover switch connecting said output latch to said outgoing lines in the normal operation and to said second input end of said judging circuit in the test operation, respectively.

18. The switching circuit of claim 17, wherein said judging circuit includes an exclusive OR gate having a first end connected to said first input end of said judging circuit and a second end connected to said second end of said fifth changeover switch.

19. The switching circuit of claim 18, wherein said judging circuit further includes a delay circuit connected between said first input end and said first end thereof of said exclusive OR gate.

20. The switching circuit of claim 19, further comprising a latch connected between said output latch and said fifth changeover switch.

21. The switching circuit of claim 8, further comprising a transposed connection generating circuit connected to said first switch for controlling a connection state in said first switch,
wherein a matrix indicative of said first predetermined exchange is in transposed relation to a matrix indicative of said third predetermined exchange.

* * * * *